United States Patent [19]

Madsen et al.

[11] Patent Number: 4,666,603

[45] Date of Patent: May 19, 1987

[54] SEMI-PERMEABLE MEMBRANE LIQUID FILTRATION APPARATUS INCLUDING ELLIPTICAL BLOCKING MEANS

[75] Inventors: Rud F. Madsen; Werner K. Nielsen, both of Nakskov; Aksel F. Johnsen, Harpelunde, all of Denmark

[73] Assignee: Aktieselskabet de Danske Sukkerfabrikker, Copenhagen, Denmark

[21] Appl. No.: 550,066

[22] Filed: Nov. 9, 1983

Related U.S. Application Data

[63] Continuation of Ser. No. 378,271, May 14, 1982, abandoned.

[30] Foreign Application Priority Data

May 20, 1981 [DK] Denmark .............................. 2228/81

[51] Int. Cl.[4] .............................................. B01D 13/00
[52] U.S. Cl. ................................ 210/321.1; 210/433.2; 210/456
[58] Field of Search .......................... 210/321.1–321.5, 210/346, 347, 433.2, 445, 451, 456, 541, 927; 55/158; 422/48; 378/271

[56] References Cited

U.S. PATENT DOCUMENTS

| 3,827,563 | 8/1974 | Boe et al. ......................... 210/321.3 |
| 3,847,818 | 11/1974 | Madsen et al. .................. 210/347 X |
| 3,872,015 | 3/1975 | Madsen ......................... 210/433.2 X |
| 4,115,274 | 9/1978 | Boddeker et al. .............. 210/346 X |
| 4,324,658 | 4/1982 | Esmund ......................... 210/541 X |

FOREIGN PATENT DOCUMENTS 123074 10/1972 Denmark ............................. 210/541

*Primary Examiner*—David Sadowski
*Attorney, Agent, or Firm*—Watson, Cole, Grindle & Watson

[57] ABSTRACT

An apparatus for the ultra or hyperfiltration of liquids to form a permeate fraction and a concentrate fraction includes a stack of membranes and membrane support plates. The stack includes two longitudinally extending main flow passages connected with a plurality of flow passages extending along the surfaces of the membranes. There is provided a device for blocking the flow of liquid from one main flow passage to the other in a zone around the center line between the two main flow passages. Ribs may be provided having a height which increases when viewed in a direction from the central part towards the periphery of a membrane support plate with the object of obtaining an improved distribution of liquid over the membrane surfaces.

17 Claims, 7 Drawing Figures

SEMI-PERMEABLE MEMBRANE LIQUID FILTRATION APPARATUS INCLUDING ELLIPTICAL BLOCKING MEANS

The present application is a continuation application of Application Ser. No. 378,271, filed May 14, 1982, now abandoned.

BACKGROUND OF THE INVENTION

This invention relates to an apparatus for the separation of a liquid into two fractions (in the following referred to as a permeate fraction and a concentrate fraction, respectively) by filtration through semi-permeable membranes, the apparatus comprising a stack of semi-permeable membranes and elongated membrane support plates arranged so as to form flow passages extending along the surfaces of the membranes, each membrane support plate comprising at least two spaced holes extending therethrough so as to form two main flow passages extending longitudinally of the stack, means for supplying liquid to be fractionated to one of the main flow passages, means for discharging a permeate fraction and means for discharging a concentrate fraction from the stack.

The prior art apparatuses of the above-mentioned type may be designed in a manner such that the liquid to be fractionated flows through the flow passages extending parallel to the membrane surfaces in a series flow pattern, a parallel flow pattern or a combination of a series flow and a parallel flow pattern.

A prior art apparatus comprises elliptical membrane support plates and the centres of the holes provided in the membrane support plates are located in or adjacent to the focal points of the ellipses.

Such a prior art apparatus suffers from the drawback that the liquid flowing along the membrane surfaces from one main flow passage towards the other is not uniformly distributed over the membrane surfaces and consequently an optimum filtration efficiency cannot be achieved.

It has been attempted to obtain an improved distribution of the liquid to be fractionated over the membrane surfaces by using membrane support plates having continuous ribs projecting from the surfaces of the plates. When assembled in a stack of membranes and membrane support plates, the ribs cause the membranes located between two membrane support plates to be pressed together within narrow zones, thus forming several separate flow passages extending from one main flow passage to the other one. Similar flow passages may be formed in case only one membrane is located in the space between two adjacent membrane support plates.

These measures have not provided a fully satisfactory solution to the problem discussed above, i.e. because of the fact that the flow resistance of the relatively long flow passages is considerably higher than that of the relatively short flow passages.

SUMMARY OF THE INVENTION

The object of the invention is to obtain a uniform distribution of the liquid to be fractionated over the membrane surfaces during the flow of the liquid from one main flow passage towards the other.

Another object is to improve the filtration efficiency of the membranes in an apparatus of the above-mentioned type.

These objects and other objects which will appear from the following description are achieved by the apparatus of the invention in which the membrane support plates have such a surface configuration that the flow of liquid along the membrane surfaces is blocked in a zone located around the centre line between the main flow passages and wherein each membrane comprises a hole having a shape corresponding to the contour of the blocked zone.

By preventing the liquid from flowing through the zones in which the length of the flow paths between the main flow passages is short, the resistance against liquid flow through the flow passages extending parallel to the membranes becomes more uniform and consequently the liquid will be more uniformly distributed over the membrane surfaces. This also applies in the case in which each of these flow passages is divided into several separate flow passages by ribs provided on the surfaces of the membrane support plates.

The blocking of the liquid flow in the above-mentioned zone may be effected by using membrane support plates having raised plateau-like zones. However, it is preferred to use membrane support plates having within the zone a hole which on both sides of each plate is surrounded by a rim preventing liquid from flowing into the zone around the centre line and into the central channel formed by the holes in the stack of membrane support plates and membranes. By providing a hole in the zone, the consumption of material for the production of the membrane support plates is reduced and furthermore the central channel formed can be utilized for special purposes, e.g., as a discharge channel for permeate or concentrate.

The filtration efficiency is particularly high when the membrane support plates have a super-elliptical contour, i.e., a contour determined by the formula $$(x/a)^m + (y/b)^n = 1$$

wherein a and b define the length of the semi-axes of the ellipse and m and n are integers of at least 2 and wherein m or n is higher than 2.

When using membrane support plates having a super-elliptical contour, the blocked central zone preferably is also of a super-elliptical shape.

When the rims extending along the central hole in the membrane support plate have a super-elliptical shape, the ribs, if any, on the surfaces of the membrane support plates preferably are parallel to the corresponding portions of the rims.

The object of the invention can also be achieved by an apparatus comprising membrane support plates having ribs extending therefrom and in which the heights of the ribs on each membrane support plate increase with increasing distances from the central part of the membrane support plate.

The increasing heights of the ribs viewed in a direction from the central part of the membrane support plates towards their periphery and the resultant increasing cross-sectional area of the flow passages extending along the membrane surfaces compensate for the increasing flow resistance due to the increasing lengths of the flow passages. This manner of obtaining a more uniform distribution of the liquid to be fractionated over the membrane surfaces is particularly suitable when fractionating dairy products and other liquids which are governed by the following equation $$\tau = K \times \gamma^n$$

wherein $\tau$ is the shear force, $\gamma$ is the shear tension, n is an integer which is determined empirically and K is an empirically determined constant.

When fractionating such liquids, the ratio of the height ($b_1$) of one flow passage to the height ($b_2$) of another flow passage should preferably be:

$$\frac{b_2}{b_1} = \frac{\frac{1}{n}}{\left(\frac{L_2}{L_1}\right)^{\frac{1}{n}+2}}$$

wherein $L_1$ and $L_2$ are the lengths of two flow passages.

In practice, n is less than 1 but higher than 0.05, and if n=0.2, the relationship between the length (L) of the flow passages and the height (b) of said passages is as follows:

| | |
|---|---|
| $L_1 = 192.8$ mm | $b_1 = 1.30$ mm |
| $L_2 = 220.8$ mm | $b_2 = 1.44$ mm |
| $L_3 = 264.7$ mm | $b_3 = 1.64$ mm |
| $L_4 = 326.0$ mm | $b_4 = 1.90$ mm |
| $L_5 = 411.2$ mm | $b_5 = 2.24$ mm. |

The membrane support plates should preferably have the same total thickness all over the plates and, therefore, the thickness of the plates per se preferably increases seen in a direction from their periphery towards their central part and more preferably in the same manner as the heights of the ribs increase in the opposite direction.

It should be understood that ribs having varying heights as described above may also be provided in an apparatus of the type first described, i.e., an apparatus in which the membrane support plates have a central blocked zone, and in which these plates optionally are of a super-elliptical shape.

BRIEF DESCRIPTION OF THE DRAWINGS

FIG. 3 is a cross-sectional view taken along the line I—I of the membrane support plate of FIG. 1.

DESCRIPTION OF THE PREFERRED EMBODIMENTS

Figure 1:
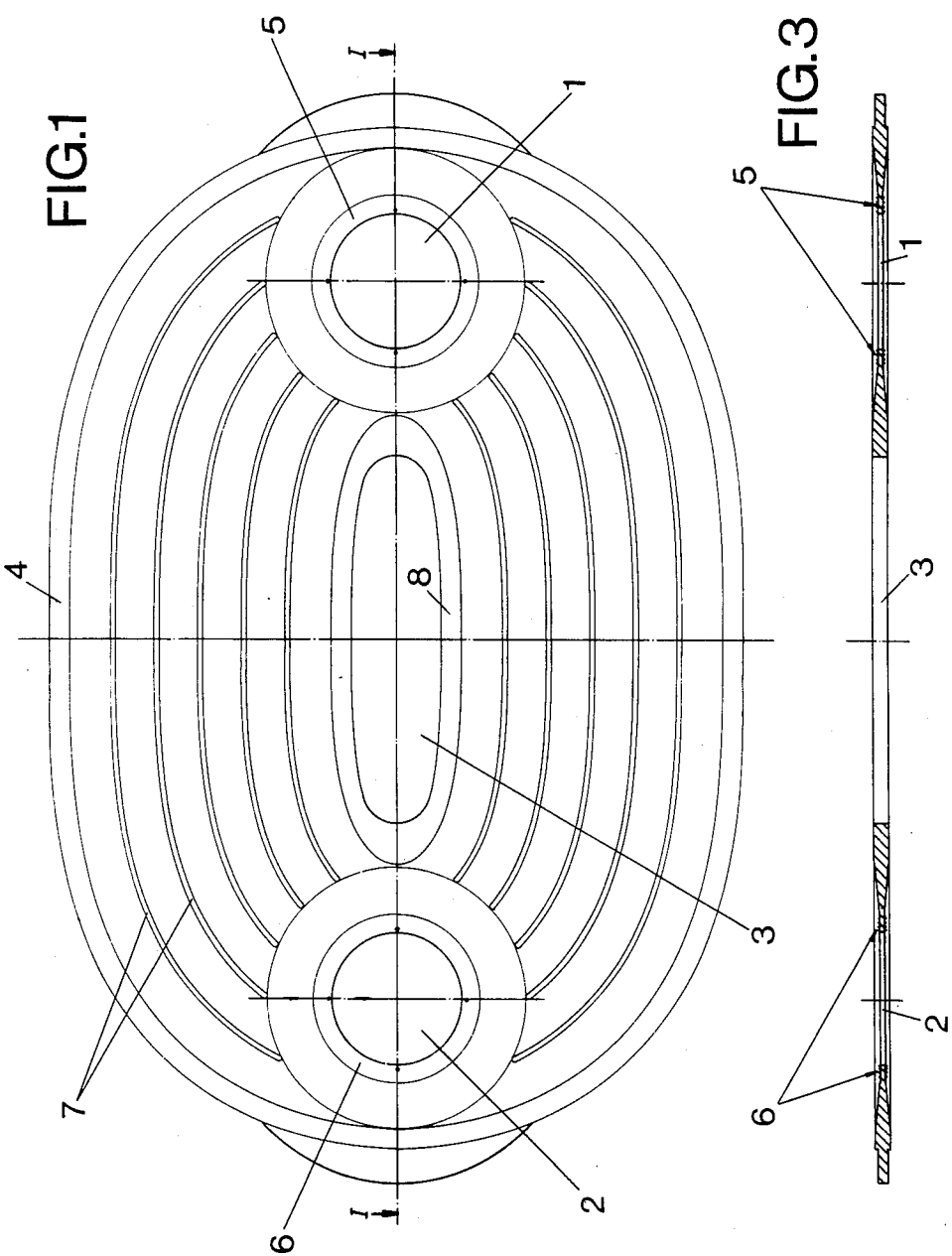
FIG. 1 is a plan view of a membrane support plate for use in an embodiment of the apparatus of the invention.

The membrane support plate illustrated in FIG. 1 and FIG. 3 comprises two circular holes 1 and 2 and an elliptical central hole 3. An outer annular sealing flange 4 is provided along the periphery of the membrane support plate. Membrane sealing means 5 and 6, respectively, are provided at the edges of the circular holes 1 and 2. The surfaces of the membrane support plates comprise upstanding ribs 7 of a curved shape and a blocking means in the form of an inner annular sealing flange 8 extending along the periphery of the central elliptical hole 3.

The contour of the membrane support plate is determined by the fact that the outer contour of the inner sealing flange 8 has a super-elliptical shape which is governed by the equation:

$$x^3/a^3 + y^2/b^2 = 1$$

in which a and b are the semi-axes of the ellipse, and by the fact that the ribs 7 and the shape of the outer sealing flange 4 form curves which are parallel to the super-elliptical inner sealing flange 8.

Figure 2:
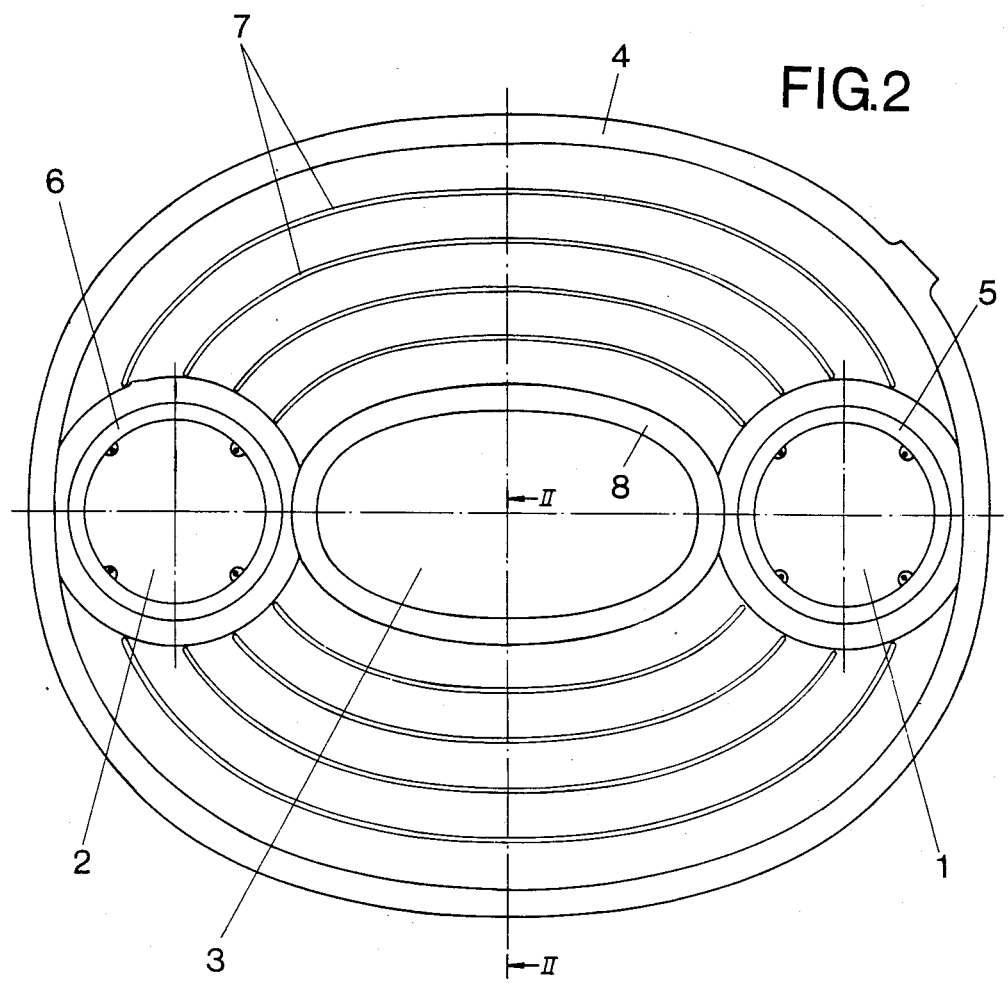
FIG. 2 is a plan view of another membrane support plate for use in another embodiment of the apparatus of the invention.
Figure 4:
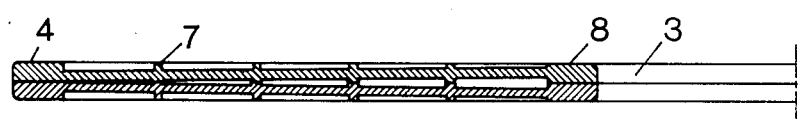
FIG. 4 is a cross-sectional view taken along the line II—II of the membrane support plate of FIG. 2.

The membrane support plate shown in FIG. 2 and FIG. 4 is constructed essentially as the plate shown in FIG. 1 and FIG. 3 and the same reference numerals as used in FIG. 1 and FIG. 3 have been used for the designation of similar parts.

The plate shown in FIG. 2 and FIG. 4 has a shape determined by the fact that the inner sealing flange 8 has a shape governed by the equation:

$$x^{2.3}/a^{2.3} + y^{2.3}/b^{2.3} = 1$$

The plate shown also differs from that of FIG. 1 and FIG. 3 in that the height of the ribs 7 increases when viewed in a direction from the central hole 3 towards the periphery of the plate. The variation in rib height increases the height of the flow passages formed between two adjacent membranes and two adjacent sets of ribs when viewed in the above-mentioned direction and thus compensates for the varying length of the flow passages in relation to the total flow resistance.

Figure 5:
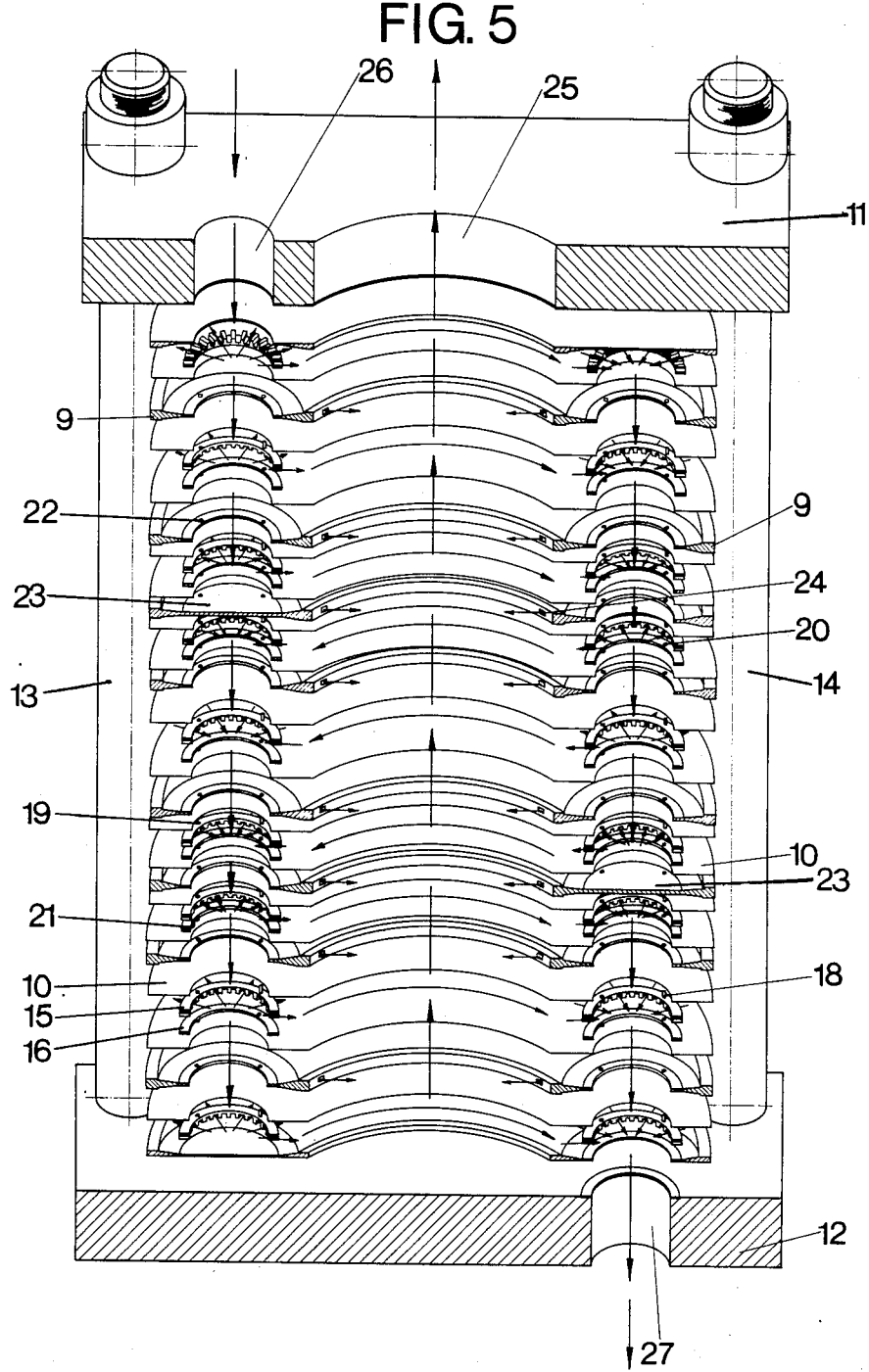
FIG. 5 is an exploded view of a preferred embodiment of the apparatus of the invention.
Figure 6:
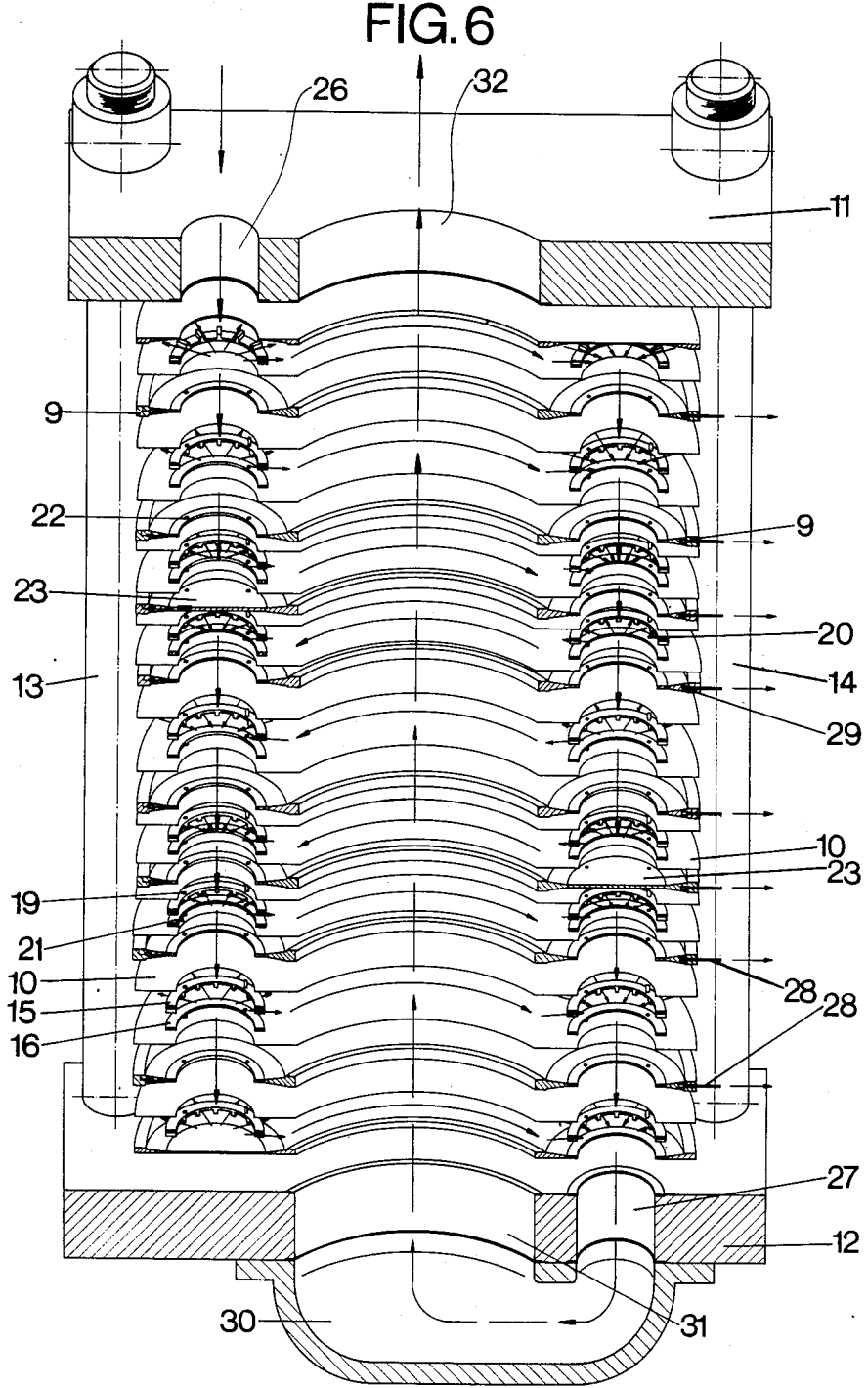
FIG. 6 is an exploded view of another preferred embodiment of the apparatus of the invention.
Figure 7:
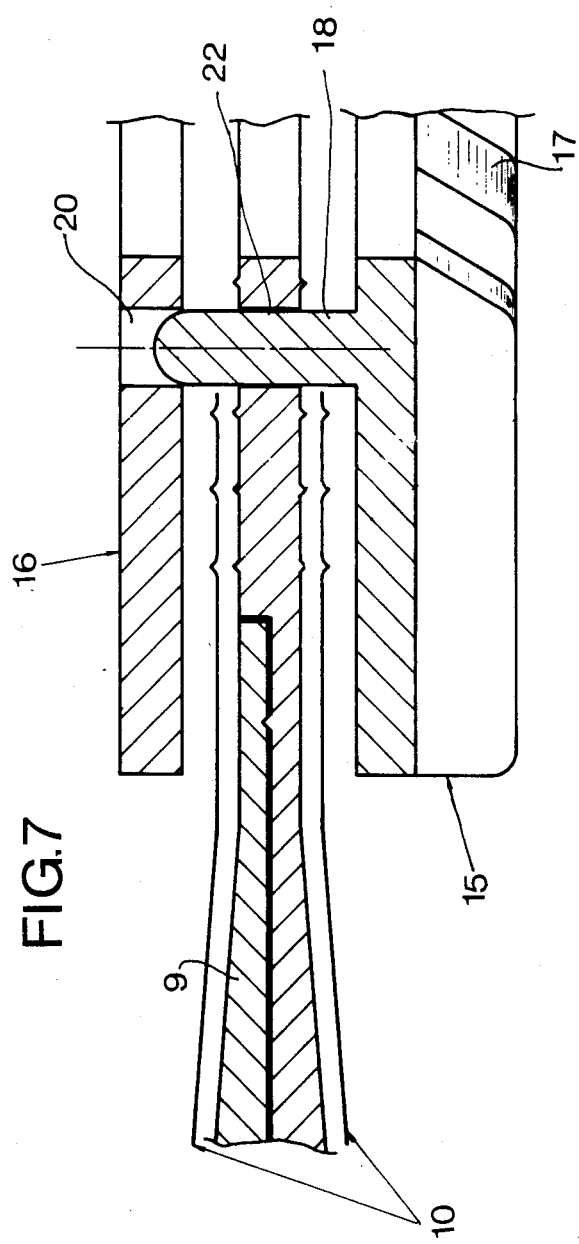
FIG. 7 is a cross-sectional view taken through the edge of a hole in a membrane support plate and the adjacent membranes as well as the sealing rings cooperating therewith.

The apparatuses shown in FIG. 5 and FIG. 6 comprise a stack of membrane support plates 9 which are constructed essentially as the plate shown in FIG. 2 and FIG. 4 and further depict membranes 10, with two membranes 10 being located between two adjacent membrane support plates 9. This stack is maintained in a compressed state between two end plates 11 and 12 by means of clamp bolts 13 and 14. The holes 1 and 2 in the membrane support plates 9 form together with corresponding holes in the membranes 10 two main flow passages extending longitudinally of the stack. The membranes 10 are sealed to the membrane support plates 9 at the edges of the holes 1,2 in the plates by means of the above-mentioned sealing means 5,6. One of these sealing means, which comprises a lower part 15 and a top part 16, is illustrated in further detail in FIG. 7. The underside of the lower part 15 comprises projections 17 with intervening passages allowing liquid to flow out of or into the adjacent main flow passage. The upperside of the lower part 15 comprises two diametrically located pins 18 and two diametrically located holes 19.

The underside of the top part 16 comprises two diametrically located holes 20 adapted to receive the pins 18 and two diametrically located pins 21 adapted to be inserted into the holes 19.

The zones of the membrane support plates located adjacent to the holes 5 and 6 comprise holes 22 having such dimensions and locations that the ends of the pins 18 and 21 can be inserted into the holes when it is desired to seal the membranes to the membrane support plates in the zone adjacent to the holes 5 and 6.

The stacks illustrated also comprise barrier plates 23 mounted at different levels in the two main flow passages so as to close the main flow passages at these points and thus force a liquid flowing through such a main flow passage to move in a parallel flow pattern towards the other main flow passage in separate parallel flow passages extending parallel to the membrane surfaces.

The membrane support plates of the apparatus shown in FIG. 5 comprise ducts 24 extending from the top and bottom surfaces of each plate to a central flow passage formed by the central holes in the membrane support plates. This central flow passage is connected with a central discharge opening 25 in the upper end plate 11.

The liquid to be fractionated in the apparatus shown in FIG. 5 is introduced through an inlet 26 in the upper end plate 11 and is passed into a longitudinally extending main flow passage. Due to the presence of the barrier plates 23 in the main flow passage, the liquid is forced to flow towards the other main flow passage in the form of parallel streams moving parallel and in intimate contact with the membrane surfaces. After having reached the other main flow passage, these streams are combined and the liquid moves down through the main flow passage. A barrier plate 23 mounted therein forces the liquid to flow towards the first main flow passage in the form of further parallel streams. Subsequently, these streams are combined and the liquid flows further down the stack within the first main flow passage until it is forced towards the second main flow passage as described above. Finally, the liquid is discharged from the apparatus through an outlet 27 in the lower end plate as a concentrate fraction.

During the movement of the partial streams of liquid to be fractionated along the surfaces of the membranes 10, the relatively low molecular compounds pass through the membranes in the form of a permeate which subsequently flows through the ducts 24 into the central flow passage and is discharged through the discharge opening 25 as a permeate fraction.

In the apparatus shown in FIG. 6 the edge of each membrane support plate 9 comprises a permeate discharge pipe 28 which is connected with an annular internal channel 29 which in turn is connected with both the top and bottom surfaces of each membrane support plate.

The apparatus shown in FIG. 6 also comprises a connecting channel 30 connecting a main flow passage with an inlet opening 31 in the lower end plate 12. The inlet opening 31 is connected with the central flow passage and the latter is connected with a central outlet 32 in the upper end plate 11.

The liquid to be fractionated in the apparatus shown in FIG. 6 is introduced through the hole 26 in the upper end plate 11 and flows through the apparatus in the same manner as explained in connection with the description of the operation of the apparatus shown in FIG. 5 with the exception that the concentrate fraction discharged through the outlet 27 via the connecting channel 30 is introduced into the central flow passage and flows up through the stack and out of the outlet 32.

The liquid fractions passing through the membranes supported by the membrane support plates 9 are collected in the annular channels 29 and the collected permeate is discharged through the permeate discharge pipes 28. The liquid being discharged through the pipes 28 forms the permeate fraction.

The drawings show vertically mounted stacks of membranes and membrane support plates. However, it should be understood that in many cases it is advantageous to use a horizontally mounted stack because such a mounting facilitates the replacement of defect membranes and/or membrane support plates.

We claim:
1. An apparatus for separating by filtration a liquid into at least one permeate fraction and at least one concentrate fraction, said apparatus including
   (1) a plurality of elongated support plates which are aligned with one another to provide a stack, each said elongated support plate having opposite surfaces, an elongated dimension, a center line which extends in said elongated dimension, and opposite ends, each said elongated support plate also including
      first and second outer holes which extend therethrough, said first and second outer holes being centered on said center line and spaced apart so as to be respectively adjacent said opposite ends,
      an elliptical blocking means extending outwardly from each of said respective opposite surfaces along said center line between said first and second outer holes, each blocking means extending in parallel with said elongated dimension,
      a plurality of parallel rib means extending outwardly from each of said opposite surfaces to provide a plurality of separate, parallel flow channels which extend between said first and second outer holes and around said blocking means therebetween,
   (2) two elongated semi-permeable membranes positioned between adjacent support plates in said stack, each said elongated membrane having a longitudinal dimension and an axial line extending in said longitudinal dimension, each said elongated membrane also including
      first and second spaced apart outer apertures extending therethrough which are centered on said axial line such that said first and second apertures will be respectively aligned with said first and second outer holes in said support plates and thus provide respective inlet and outlet flow passages within said stack,
   (3) means for supplying input liquid which is to be separated into said inlet flow passage, said input liquid flowing through said inlet flow passage, then along said plurality of separate flow channels formed on the opposite surfaces of said support plates, and then into said outlet flow passage, said input liquid contacting the two membranes positioned between the adjacent support plates as it passes along said flow channels and thus become separated into permeate and concentrate fractions,
   (4) means for removing each permeate fraction from said stack, and
   (5) means for removing each concentrate fraction from said stack.

2. An apparatus as defined in claim 1, wherein each successive rib means located outwardly of said blocking means on each of the opposite surfaces of each said support plate extends a greater distance outwardly from the associated surface of the support plate than the previous rib means.

3. An apparatus as defined in claim 2, wherein each said support plate includes a central hole therethrough, said central hole being located within the blocking means extending outwardly from its opposite surfaces, each said blocking means comprising an elliptical inner sealing flange.

4. An apparatus as defined in claim 3, wherein each said membrane includes a central aperture therethrough which is aligned with the central holes in said support plates so as to provide a central flow passage within said stack.

5. An apparatus as defined in claim 4, including barrier plates located over alternating first and second outer holes of respective support plates in said stack to alternately block said inlet and outlet flow channels and force input liquid to sequentially flow from said inlet flow passage into and along the plurality of separate flow channels between adjacent support plates and over surfaces of the two membranes therebetween, into and through a portion of said outlet flow passage, then into and along the plurality of separate flow channels between other adjacent support plates and over surfaces of the two membranes therebetween.

6. An apparatus as defined in claim 5, wherein at least one said elliptical inner sealing flange of said plurality of elongated support plates includes a flow duct extending therethrough which communicates with the central hole in said support plate to allow a permeate fraction of said input liquid to pass into said central flow passage.

7. An apparatus as defined in claim 6, wherein said stack has first and second opposite ends, and wherein said inlet flow passage communicates with said first end and said outlet flow passage communicates with said second end.

8. An apparatus as defined in claim 7, wherein said central flow passage communicates with said first end.

9. An apparatus as defined in claim 8, wherein said apparatus includes first and second end plates at the respective first and second ends of said stack and clamping means connecting said first and second end plates together, said first end plate having holes therein which respectively communicate with said inlet flow passage and said central flow passage in said stack and said second end plate having a hole therein which communicates with said outlet flow passage in said stack.

10. An apparatus as defined in claim 5, wherein each said support plate includes outer annular sealing flanges extending outwardly from the periphery of each opposite surface thereof, an annular channel which communicates with both said opposite surfaces thereof, and a discharge pipe which extends from said annular channel at a point adjacent said second outer hole therein and outwardly through said outer annular sealing flange to allow a permeate fraction of said input liquid to be removed from said stack.

11. An apparatus as defined in claim 10, wherein said stack has first and second opposite ends, and wherein said inlet flow passage communicates with said first end and said outlet flow passage communicates with said second end.

12. An apparatus as defined in claim 11, wherein said central flow passage communicates with said first end.

13. An apparatus as defined in claim 12, wherein said apparatus includes first and second end plates at the respective first and second ends of said stack and clamping means connecting said first and second end plates together, said first end plate having holes therein which respectively communicate with said inlet flow passage and said central flow passage in said stack and said second end plate having holes therein which respectively communicate with said central flow passage and said outlet flow passage in said stack.

14. An apparatus as defined in claim 13, wherein said apparatus includes means connected to said second end plate to communicate said outlet flow passage with said central flow passage.

15. An apparatus as defined in claim 5, wherein the central hole in each support plate is elliptical, and wherein the plurality of flow channels in each support plate extends in parallel with the periphery of said elliptical central hole.

16. An apparatus as defined in claim 5, wherein the first and second outer holes in each support plate are circular.

17. An apparatus as defined in claim 1, wherein said elongated support plates and said elongated semipermeable membranes are elliptical in shape.

* * * * *